United States Patent
Bordener

(10) Patent No.: US 6,517,897 B1
(45) Date of Patent: Feb. 11, 2003

(54) METHODS AND MATERIALS FOR THE MANUFACTURE OF A SOLID SURFACE ARTICLE

(75) Inventor: Robert Bordener, Bloomfield Hills, MI (US)

(73) Assignee: Korstone L.L.C., Detroit, MI (US)

( * ) Notice: Subject to any disclaimer, the term of this patent is extended or adjusted under 35 U.S.C. 154(b) by 194 days.

(21) Appl. No.: 09/712,437

(22) Filed: Nov. 14, 2000

(51) Int. Cl.[7] .............................. B05D 1/02; B05D 7/22
(52) U.S. Cl. ...................... 427/133; 427/181; 427/201; 427/385.5; 427/421
(58) Field of Search ................................ 427/133, 181, 427/201, 385.5, 421

(56) References Cited

U.S. PATENT DOCUMENTS

| | | | |
|---|---|---|---|
| 4,544,584 A | 10/1985 | Ross et al. | 428/15 |
| 5,244,941 A | * 9/1993 | Bruckbauer et al. | 523/171 |
| 5,476,895 A | 12/1995 | Ghahary | 524/437 |
| 5,789,032 A | 8/1998 | Le Cong et al. | 427/346 |

FOREIGN PATENT DOCUMENTS

| | | | |
|---|---|---|---|
| GB | 1379130 | * | 2/1975 |
| JP | 07-196356 | * | 8/1995 |
| JP | 08-091902 | * | 4/1996 |
| JP | 2000-158457 | * | 6/2000 |
| PL | 170703 | * | 1/1997 |

* cited by examiner

Primary Examiner—Erma Cameron
(74) Attorney, Agent, or Firm—Gifford, Krass, Groh, Sprinkle, Anderson & Citowski, P.C.

(57) ABSTRACT

There is disclosed herein a method for manufacturing a solid surface article from a composition of a thermosetting resin, a polymerizable vinyl material, an air release agent and a wetting agent together with sufficient amounts of a thixotropic agent to give the composition a thixotropic index of at least 4.5, as well as a solid, particulate material having a particle size of up to 0.1 inch. The composition is coated into a mold and cured to produce a hardened solid surface article. Also disclosed is a compression molding process for applying a backing material to the article.

15 Claims, 2 Drawing Sheets

METHODS AND MATERIALS FOR THE MANUFACTURE OF A SOLID SURFACE ARTICLE

FIELD OF THE INVENTION

This invention relates generally to methods for the manufacture of solid surface articles such as countertops, sinks, backsplashes and the like. More specifically, the invention relates to methods and materials for a mold based process for the manufacture of high quality solid surface articles which are resistant to moisture and simulative of stone.

BACKGROUND OF THE INVENTION

Countertops, sinks, tables, sills and the like have long been manufactured from marble, granite and other such natural stone; however, natural stone is expensive, difficult to fabricate, heavy, and very prone to breakage and staining. Hence, a number of synthetic materials simulative of stone have been employed for these purposes. Such materials are based upon organic polymers used either alone or in combination with fillers and particulates comprised of natural stone, man-made materials and various combinations. Very often, such synthetic materials are fabricated utilizing curable resins which can be cast or sprayed into place and which subsequently harden to produce a simulated stone article.

One class of simulated stone materials comprises those known in the art as "cultured marble." Such cultured marble articles have an exterior surface comprised of a polymeric gel coat, which is typically a relatively transparent, relatively thin layer of cured polymeric resin which covers a thicker body of opaque polymeric resin which contains pigments, mineral particles, fillers and the like, and which is generally non-homogeneous so as to simulate the veining and color variations of natural stone. The durability of cultured marble is relatively low, owing to the generally low cut and abrasion resistance of the exterior gel coat. Also, moisture resistance of the gel coat is not very great, and hence moisture-caused delamination can occur. Nonetheless, cultured marble is relatively low in cost and is widely utilized.

Another class of synthetic surface materials comprises solid surface materials. These materials do not include a gel coat but have an exterior surface typically comprised of a relatively durable polymer based material which typically comprises a fairly opaque polymeric body loaded with relatively high levels of a high strength filler such as alumina trihydrate or the like, together with particulate inclusions. The particles may comprise a solid polymer, a mineral material or a composite of polymer and mineral. The particulate inclusions typically are visually distinct from the base polymer and provide the material with the appearance of stone. Solid surface materials are relatively hard, and since they do not include an exterior gel coat, scratches, chips and the like may be removed by polishing the material to expose a fresh surface. Solid surface materials are typically fabricated from a curable polymeric resin having fillers and particulate material therein. Solid surface coatings are generally applied to a support substrate which may comprise another body of polymer, wood, metal or the like. Such coatings are typically applied by spraying, and are generally then polished to provide a finished surface. Solid surface materials are relatively expensive, with costs being roughly equivalent to that of natural stone.

U.S. Pat. No. 5,476,895 discloses a solid surface coating simulative of granite. This coating is fabricated from polymeric resin which includes therein particulate granules which are composites of thermoplastic and thermoset polymers. Fabrication of this coating requires that the particulate inclusions be isopycnic with the resin, that is to say the particles must be neutrally buoyant in the resin. Isopycnicity is required in order to prevent the particles from stratifying in the coating as it cures, thereby destroying the stone-like appearance of the material.

Another solid surface coating is disclosed in U.S. Pat. No. 5,789,032. This coating is based upon a thermoset resin, and is applied to a solid support such as particleboard. U.S. Pat. No. 4,544,584 discloses a synthetic stone article fabricated from a curable organic resin having particulate matter dispersed therein so as to be simulative of onyx.

Prior art simulated stone materials are generally expensive to fabricate and often have poor moisture resistance. Therefore, such materials are less than satisfactory for many applications. There is thus a need for materials and methods whereby solid surface, simulated stone articles may be readily fabricated by low cost, easy to implement processes. Furthermore, the resultant article should be high in hardness and resistant to moisture. As will be explained in detail hereinbelow, the present invention is directed to methods and materials for the fabrication of high quality solid surface materials. These and other advantages of the present invention will be apparent from the drawings, discussion and description which follow.

BRIEF DESCRIPTION OF THE INVENTION

There is disclosed herein a method for the manufacture of a solid surface article. The method includes the steps of providing a mold having a mold cavity defined therein, which cavity corresponds to the article being fabricated. A curable coating composition is provided. This composition includes at least 25% by weight of a liquid, thermosetting resin; 25–40% by weight of a polymerizable vinyl material; 0.1–10% by weight of an air release agent; 0.1–10% by weight of a wetting agent; and a thixotropic agent present in an amount sufficient to provide the composition with a thixotropic index of at least 4.5. The curable coating composition further includes 10–40% by volume of a solid, particulate material having a particle size of up to 0.1 inch therein. This curable composition is coated onto at least a portion of the mold cavity and allowed to cure so as to form the article. In some instances, a first layer of the curable composition is applied to the mold and at least partially cured, and then a curable body of backer material is disposed upon the layer of at least partially cured material.

In particular embodiments, the thermoset resin comprises a neopentylglycol isophthalate resin. The composition may further include mineral fillers, coupling agents, coloring agents, ultraviolet stabilizers and the like. The present invention avoids the needs for using isopycnic particles in the composition, and in some instances, the preferred particles are negatively buoyant.

Also disclosed herein is a fabrication process wherein a first coat of solid surface material is applied to a mold and at least partially cured, and a compression molding process is employed to conform a body of at least semi-solid backing material onto the solid surface material.

DETAILED DESCRIPTION OF THE INVENTION

Figure 1:
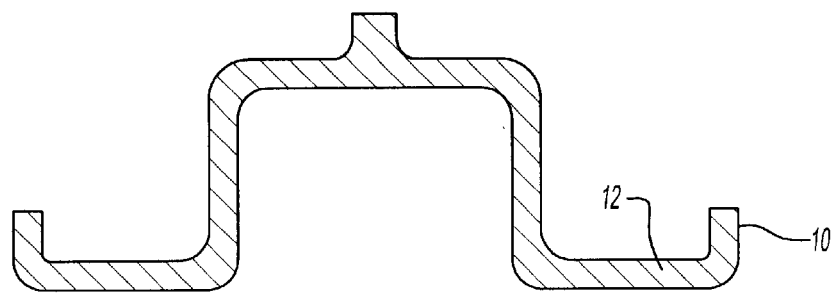
FIG. 1 is a cross-sectional view of a representative mold of the type which can be utilized to manufacture a sink in accord with the present invention.

In accord with the present invention, solid surface articles are manufactured by a molding process utilizing a curable coating composition having therein at least 25% by weight of a liquid thermosetting resin and 25–40% by weight of a polymerizable vinyl material. The coating composition further includes an air release agent in the amount of 0.1–10% by weight and a wetting agent in an amount of 0.1–10% by weight together with a thixotropic agent in an amount sufficient to provide the composition with a thixotropic index of at least 4.5. The coating composition also includes a solid particulate material which functions to give the finished article a stone-like appearance. The solid particulate material has a particle size in the range of up to 0.1 inch. The composition is coated into a mold cavity by spraying, painting, rotamolding, slurrying or the like. The composition is then cured to produce the finished article. In many instances, a relatively thin facing layer of the solid surface material is coated into a mold, typically to a thickness in the range of 30–40 mils, and once this layer is at least partially hardened, a backing material, typically a lower cost, highly filled resin, is added to the mold.

The liquid, thermosetting resin may comprise any such resin known in the art, and within this disclosure, thermosetting resins comprise curable resins which crosslink and harden as a result of chemical reactions which are thermally activated. Such materials include room temperature curable resin formulations as well as formulations which cure at elevated temperatures. One particularly preferred thermosetting resin comprises neopentylglycol isophthalate resin. Such resins are available from the Neste Polyester Corporation under the designation Max Guard C.G. 2900, and other sources are known to those of skill in the art. Other thermosetting resins which may be employed in the practice of the present invention comprise SIL93AE-1045 available from the Silmar Corporation. Typically, the thermosetting resin comprises at least 25% by weight of the composition.

The composition of the present invention further includes by weight 25–40% of a polymerizable vinyl material. Within the context of this disclosure, such materials are meant to include resins, oligomers and monomers which are polymerized through a vinyl linkage. As such, such materials include styrenes as well as alkylated styrenes such as methylstyrenes and the like. Also included within the general description of polymerizable vinyl materials are acrylic materials such as hydroxyacrylates. The addition of polymerizable vinyl materials has been found to enhance the weather resistance of the articles made in accord with the present invention. In many instances, resin blends including thermosetting resin together with polymerizable vinyl materials are commercially available. One such blend comprises a material sold under the designation Polydyne resin number ISO-9920 by the Polydyne Corporation of Johnson Creek, Wis. Another such resin blend comprises a product sold under the designation Alpha 800 by ITW Evercoat of Cincinnati, Ohio. Another material comprising acrylic modified NPG isophthalate resin is sold by the Silmar Corporation under the designation SIL95AE-1045.

In accord with the present invention it has been found that moisture resistance and stability of the articles of the present invention are greatly enhanced if an air release agent and a wetting agent are included in the formulations. The air release agent serves to eliminate air bubbles in the resin mixture, which bubbles can cause porosity and hence poor integrity. The wetting agent has likewise been found to enhance the moisture resistance of the articles, presumably by establishing a good interface between the resin components and particulate components of the composition of the present invention. The wetting agent and air release agent are both present in a typical amount of 0.1–10% by weight. There are a number of wetting agents and air release agents which are known in the art. For example, one particularly preferred air release agent comprises polysiloxanes dissolved in a light aromatic naphtha such as the material sold by the Byk Chemie Corporation under the designation Byk-A555. Particularly preferred wetting agents comprise low molecular weight polymer surfactants, such as acrylic polymers, typically dissolved in solvents such as isoalkane materials, and one such material is available from the Byk Chemie Corporation under the designation Byk-W996. Other equivalent materials will be readily apparent to one of skill in the art and may be likewise employed. In some instances resin compositions which include wetting agents or air release agents are commercially available and may be used in the practice of this invention.

The compositions of the present invention include a thixotropic agent therein. There are a number of thixotropy building agents available to those of skill in the art, and one particularly preferred group of materials employed for the practice of the present invention comprised fumed silica materials such as the material sold under the designation Cab-o-sil M-5 by the Cabot Corporation. In accord with the present invention, the thixotropic agent is present in an amount sufficient to provide the composition with a thixotropic index of at least 4.5. As is known in the art, the thixotropic index of a material is measured by determining its viscosity under high shear and low shear conditions, as for example through the use of a Brookfield viscometer. The thixotropic index of a material is the ratio of its viscosity as measured at a first rate of rotation to its viscosity at a second rate of rotation which is tenfold greater. Typically, the low speed rotations are measured at 2 to 5 rpm and the higher speed rotations at 20 to 50 rpm. The higher the thixotropic index, the greater is the thixotropic effect. In general, it has been found that thixotropic indices of 4 or less are unsuitable for the practice of the present invention and thixotropic indices of at least 4½, and most preferably 4½ to 6, are best for the practice of the present invention.

The compositions of the present invention include 10–40% by volume of a solid, particulate material. This particulate material, often referred to in the art as "chips" or "granules," provides the cured composition with a stone-like appearance. As such, the particulate material contrasts with the base resin mixture. The particulate material may comprise a solid polymer material, a synthetic or natural mineral, or a mixture of the two. It is one notable feature of the present invention that the compositions employed herein do not require that the particulate materials be isopycnic. This allows for greater latitude in the formulation of materials and avoids the expense associated with precisely adjusting the density of the granules. The hardness of the granules may be the same as that of the base resin, or it may differ without compromising the resultant product. The particulate material may be in the form of flakes, chips, irregular grains, or regular shapes. In some specific instances, it has been found that a very pleasing aesthetic effect is obtained when the particulate material is in the form of fibers, particularly fibers having an aspect ratio, as defined by width to length, of 5 or more. Generally, the particle size of the granules is no more than 0.1 inch, and most preferably, the granules have a size in the range of 0.004 inch to 0.040 inch with a mean size distribution of about 0.020 inch. In particular instances, larger or smaller granules will be employed, and it is further anticipated that granules of different sizes may be mixed into one material. One preferred group of granules are comprised of polybutyl terephthalate (PBT) polymer. The granules can include colorants and fillers such as ATH. As previously noted, the granules need not be isopycnic with the base resin. Such granules are available from G.E. Plastics under the designation Xenoy®. Other suppliers of granule material include: Du Pont Engineering Polymers, Michael Day Enterprises, Terry Industries Inc. and Bayer A. G.

In one specific embodiment, at least a portion of the granules are transparent and the base resin is nearly or completely opaque. The transparent granules may be colored or colorless. This combination of transparent granules and an opaque background produces a pleasing optical effect. In one such embodiment, the granules (which preferably comprise 10–40% by volume of the composition) are a mixture of transparent and opaque material. In one such formula, the total volume of granules is comprised of, by weight, 50–95% of a crushed mineral, such as a natural or synthetic mineral, at least 0.3% of a pigment, at least 0.5% of colored granules of the type described above, and at least 2% of water clear granules. The clear granules preferably have a size of up to 0.1 inch, and may be made of glass or polymeric material. In formulations of this type, the pigment and/or crushed minerals render the base resin opaque, and the clear granules give a transparent effect.

The compositions of the present invention may also include ancillary ingredients as is known in the art. Such ingredients can include coloring agents which serve to provide the base resin composition with an appropriate stone-like background color. Likewise, filling agents are frequently added to the base resin. These fillers are to be distinguished from the particulate material insofar as they are generally of very fine particle size, typically U.S. 200 mesh and lower. Fillers serve to decrease the cost of the base resin, and also advantageously operate to increase the hardness and stone-like character of the base resin, and lessen the coefficient of thermal expansion and contraction. One particularly preferred filler material comprises alumina trihydrate, generally known in the art as ATH. Silane coupling agents can be included to facilitate bonding of the resin to particulate materials, especially hydrated mineral fillers and the like. Depending on the particular resin systems employed, curing accelerators, curing retardants and the like may be included. Also, ultraviolet stabilizers, fire retardants and similar ancillary ingredients may likewise be included.

The resin compositions of the present invention have been found to be very stable, and can be prepared up to eight months in advance of use without deleterious effect. The high degree of thixotropy of the compositions facilitates retention of the particulate material therein and also aids in providing a smooth and even coating when the material is applied to a mold. This is particularly important when fairly complex surfaces, such as sinks, are being fabricated. The composition of the present invention provides a durable, hard, stone-like surface which is very resistant to moisture, cracking, hazing and adverse weather conditions.

The compositions of the present invention are particularly well suited for a mold forming process and are specifically well suited for spray coating. In a typical mold forming process in accord with the present invention, there is provided a mold having a forming surface therein corresponding to the exterior surface of the article which is to be fabricated. The compositions of the present invention are sprayed into the mold so as to coat the forming surface. It is possible, and desirable in some instances, to fill the entire mold with the compositions of the present invention so as to provide a relatively thick, homogeneous solid surface body; however, there are economic advantages to fabricating articles in accord with the present invention as composite bodies having an exterior veneer of solid surface material of the present invention, and a backing layer of a relatively low cost material. Such composite articles are made possible by the present invention since the solid surface material thereof is very durable and strong, and since the compositions of the present invention are readily applied to a mold by spraying. In instances where a composite body is being fabricated, a surface veneer comprising approximately 30–40 mils of the material of the present invention is applied to a mold and allowed to at least partially cure. A backing material, typically comprised of a relatively low cost resin having fairly high loadings of a low cost filler such as calcium carbonate therein, is then disposed upon the veneer layer so as to fill the remainder of the mold. Backer resins may include dicyclopentadienes, orthophthalates or the like. One backer resin having utility in this invention comprises the material sold by the Reichold Chemical Company under the designation #32141. The cured article thus produced is comprised of a hard, exterior veneer of solid surface material of approximately 30–40 mils thickness and a supporting backer layer of a lower cost, relative low grade resin/mineral composition.

Figure 2:
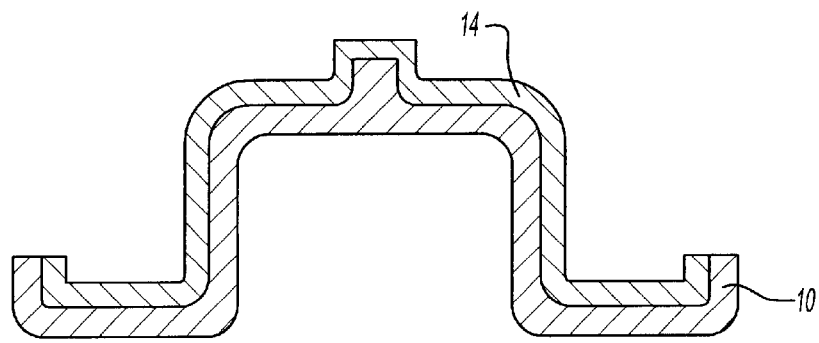
FIG. 2 is a depiction of the mold of FIG. 1 showing a body of solid surface material of the present invention disposed therein.

There are a number of molding processes which may be implemented in accord with the present invention. One of the above processes will be described with reference to the following figures. FIG. 1 depicts a mold which may be employed in accord with the present invention for the fabrication of a sink. The mold 10 has a forming surface 12 which corresponds to the exterior surface of the sink. The mold 10 may be fabricated from metal, polymeric material, or composites. One particularly preferred mold structure is comprised of wood which is faced with a relatively smooth polymeric material. FIG. 2 depicts the mold 10 with a layer of solid surface material 14 of the present invention applied thereto. As discussed above, this layer is most preferably applied by a spraying process; although, the material can be painted on, slurried on, or applied by other techniques such as rotamolding. In those instances where a solid surface article is to be manufactured entirely from the composition of the present invention, the layer 14 is applied to a total thickness corresponding to the thickness of the finished article, allowed to cure in the mold, and then removed. Finishing of the article may require some trimming of flashing and polishing of the article; although, use of a polished mold will eliminate or significantly reduce polishing steps. It is to be understood that the layer 14 can be applied in a single step, or a plurality of sublayers can be built up to a final thickness. Curing times and temperature will depend upon the specific solid surface composition being employed.

Figure 3:
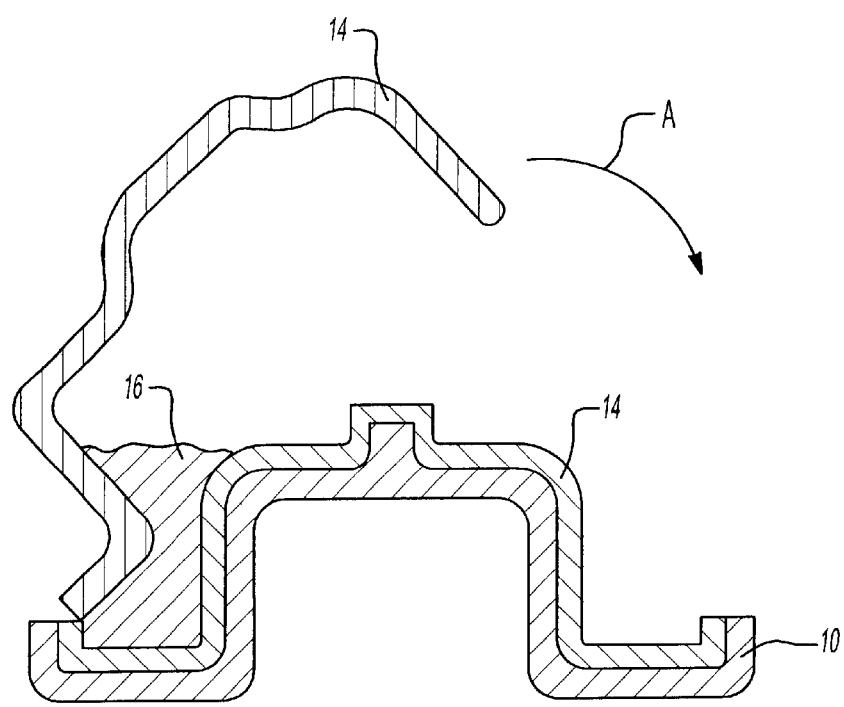
FIG. 3 is a schematic depiction of a first stage in a compression molding process employing the mold and solid surface coating of FIG. 2 together with a top compression member.
Figure 4:
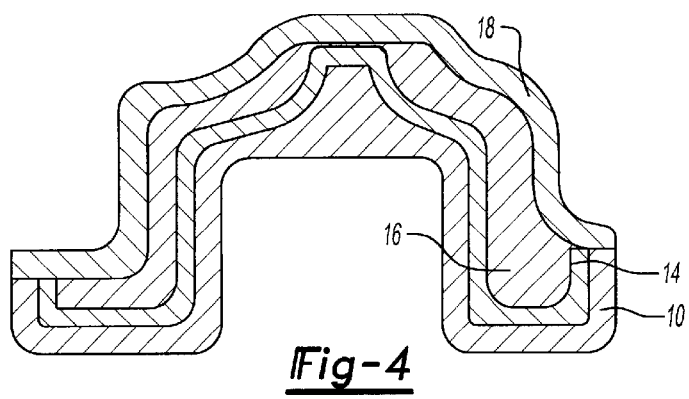
FIG. 4 is a depiction of a further stage in the compression molding process shown in FIG. 3 wherein the top compression member is closed.

In many instances, it is desirable to incorporate a backing material onto a veneer of solid surface material. The remaining figures depict further steps in the previously discussed process wherein a backing layer is applied to a solid surface veneer layer by a compression molding process, it being understood that other processes may be similarly employed in the practice of the present invention. Referring now to FIG. 3, there is shown the mold 10 and solid surface layer 14 as previously discussed. FIG. 3 also depicts a body of backer material 16 disposed on the back (i.e. unfinished) side of the solid surface veneer layer 14. The backer material 16 is most preferably comprised of a relatively low cost thermosetting resin filled with relatively large amounts of calcium carbonate or similar mineral fillers. This backing material has a fairly stiff, putty-like consistency. As further depicted in FIG. 3, a compression member 18 is hingedly attached to the mold unit 10, and it will be apparent from the figure that by closing the compression member 18 against the remainder of the mold 10, as indicated by a row A, the backing material 16 will be compressed into contact with the layer 14 of solid surface material, and FIG. 4 depicts the mold assembly in such a closed configuration. Though not illustrated, it is to be understood that the compression member 18 may include vents or outlets for allowing trapped air and/or excess backing material to pass therethrough.

Figure 5:
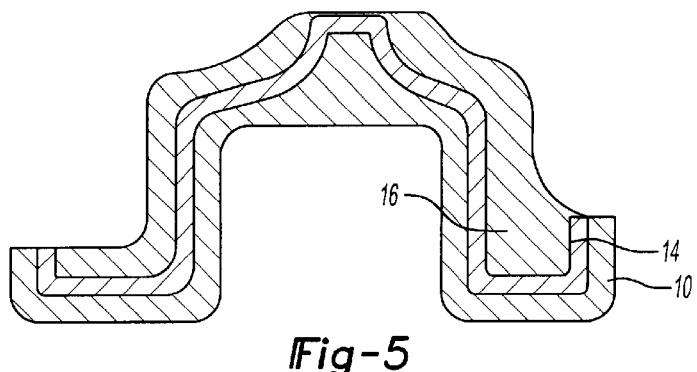
FIG. 5 is a depiction of a further stage in the compression molding process shown in FIG. 4, wherein the top compression member is removed.

As depicted in FIG. 5, the compression member 18 is removed from the assembly, and this may be done either before the backing material 16 is fully cured, or thereafter. In a subsequent step, the article is removed from the mold 10. In an additional, optional, step, a layer of solid surface material may be spray coated onto the rear surface of the backing material 16 so as to give a finished article which gives the appearance of being fabricated entirely from solid surface material. This step can be implemented either before or after the article is demolded.

Figure 6:
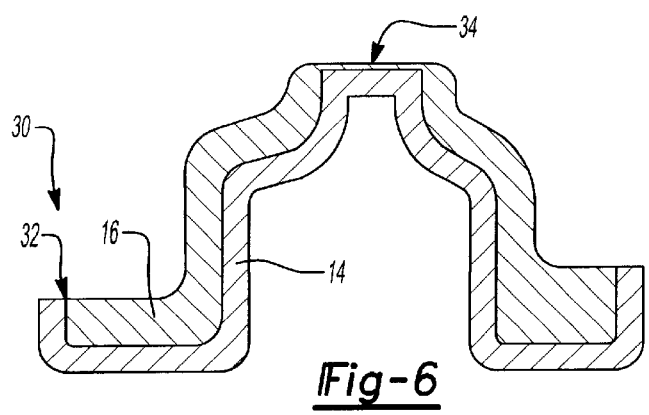
FIG. 6 is a cross-sectional view of a sink as produced in the compression molding process of FIGS. 3–5 prior to final finishing.
Figure 7:
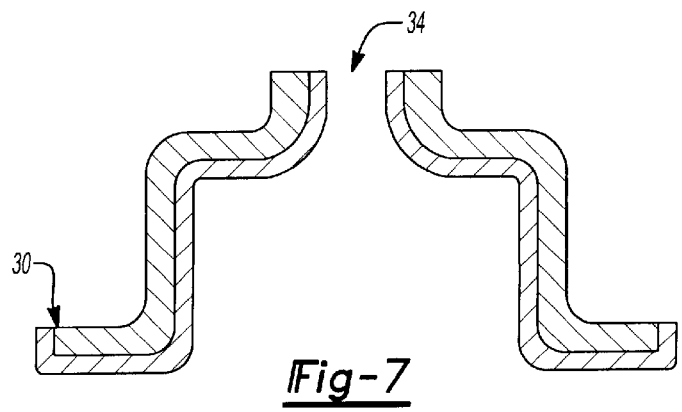
FIG. 7 is a cross-sectional view of the molded sink after final processing.

As shown in FIG. 6, the result of the compress ion molding process is a finished article 30 configured as a sink, and comprising a front veneer layer 14 of solid surface material and a backing body 16 (and optionally a backside veneer). It will be noted that by appropriately configuring the molds, grinding, drilling and finishing steps can be minimized. For example, the mold can be configured so as to provide a clean edge, for example edge 32 having a wrap-around portion of solid surface material 14 covering the edge of the backing material 16. In such instance, finishing steps will merely involve removal of flashing from the edge. As noted, the article 30 is configured as a sink, and as such includes a drain connection molded therein 34. As shown in FIG. 6, this connection 34 is not yet opened. Final finishing of the article 30 may comprise grinding down the back surface of the drain portion 34 to form a drain opening therethrough. Clearly, by appropriately configuring the molds, this step could be eliminated. FIG. 7 depicts a finished article 30 comprising a sink unit as described hereinabove.

It is to be understood that yet other molding processes may be implemented in accord with the present invention. For example, compression molding processes may be carried out utilizing differently configured molds. Likewise, the materials of the present invention may be used in a non-compression molding process. Also, while application of the material by a spray process has been discussed, it is to be understood that material may be simply cast or painted onto a mold surface. It is an important feature of the present invention that the composition thereof can be utilized in a molding process, and that the surface of the finished article faithfully replicates the surface of the mold thereby minimizing finishing steps. It is also significant that the material of the present invention, when cured, is highly resistant to moisture, thermocycling and ambient atmospheric conditions. Therefore, the materials of the present invention can be advantageously employed to fabricate articles such as sinks, washbowls, bathtubs, shower stalls, slab materials, and the like which are exposed to adverse environmental conditions.

EXAMPLES

The principles of the present invention may be implemented utilizing a number of different formulations. The following examples are illustrative of particular embodiments of the present invention, but are not meant to be limitations upon the practice thereof.

Example 1

A coating composition was prepared from 70% by weight of a commercial mixture of thermosetting and vinyl resin sold under the name Polydyne No. 150–9920 by the Polydyne Corporation of Johnson Creek, Wis. To this was mixed 30% by weight of polybutyl terephthalate granules having an average particle size of 0.020 inches. To this was added 1% by weight of a methyl ethyl ketone peroxide catalyst sold under the designation Lupersol DDM-9 by the Elf-Atochem America Corporation of Pifford, N.Y. The particular Polydyne 150–9920 resin, as supplied includes ½% by weight of each of air release agent Byk-555 and wetting agent Byk-990. 2% by weight (on the basis of the resin) of fumed silica was added to the resin mixture. The finished material had a thixotropic index of approximately 5.5. This material was sprayed into a mold configured to shape a countertop. The thickness of the coating was approximately 0.035 inch, and the composition was cured for 12 minutes at 100° F.

Example 2

A second composition was prepared from a commercial blend of resins including thermosetting and vinyl resins sold under the name Alpha 800 by ITW Evercoat of Cincinnati, Ohio. To this was added 25% by weight of a granular material comprising ATH filled, cured resin sold by United Granules of Mt. Bethel, Pa. The mean particle size of these granules was approximately 0.020 inches, although in other embodiments particles in the range of 0.004 to 0.1 inches are similarly employed. The resin includes ½% by weight of the Byk-990 wetting agent and the Byk-555 air release agent. The amounts of the air release and wetting agents were based on the weight of the ATH filler. Fumed silica, in an amount sufficient to produce a thixotropic index of approximately 6, was added to this material. The composition was spray coated into a mold, as described above, and cured.

Example 3

In this example, 85% by weight of a commercial resin comprising an acrylic modified NPG isophthalate resin sold by the Silmar Corporation under the designation SIL95AE-1045 was mixed with 15%, by volume, of a fibrous particulate sold under the name Particulene® by Aritura Cultured Stone Company of Tucson, Ariz. In addition, fumed silica sufficient to build a thixotropic index to approximately 5.5 was added along with approximately ½%, by weight, of air release agent Byk-A555 and ½% by weight of wetting agent Byk-W990. This mixture was sprayed into a mold and cured for 12 minutes at 105° F. to produce a finished, solid surface item.

Example 4

A backing composition which can be employed with any of the foregoing solid surface compositions was prepared from 20% by weight of an orthophthalic resin sold under the name LB 5870–106 by the Ashland Corporation together with 80% by weight of a calcium carbonate filler obtained from the Huber Corporation under the designation W-6. Optionally, air release agents and/or wetting agents can be added typically in an amount equal to ½ weight percent of the carbonate filler. This resin composition is heated to approximately 105° F. and poured into the mold.

In all of the foregoing compositions, an ATH filler in the amount, by weight, of approximately 0–15% can be added to increase the hardness and mineral like nature of the solid surface material. Particle size of this ATH filler is in the range of 0.003–0.0015 inch, and a suitable material is obtainable from the Alcan Corporation under the designation WP-31. Other suitable mineral fillers comprise ground glass, quartz particles, granite or the like, as well as ceramic particles. In such instances, coupling agents, such as silane couplers, as are known in the art, may be included to facilitate bonding of the resins to the glass or ceramic material.

Yet other modifications and variations of the foregoing may be implemented. For example, the granular material employed in the foregoing examples need not be a synthetic composite but may comprise crushed stone in some particular instances. Crushed stone may be used in addition to synthetic granules or as a complete replacement therefore. Granules of crushed stone typically comprise 5–25% by volume of the resin. In those instances where crushed stone is employed, it may be advantageous to include a silane coupling agent. Other additives, such as UV stabilizers and the like may also be added, and the types, quantities and utilities as such stabilizers will be readily apparent to one of skill in the art.

In view of the teaching presented herein, various other modifications and variations of the present invention will be apparent to one of skill in the art. Therefore, it is to be understood that the foregoing drawings, discussion and description are illustrative of particular embodiments of the invention, but are not meant to be limitations upon the practice thereof. It is the following claims, including all equivalents, which define the scope of the invention.

What is claimed is:

1. A method for the manufacture of a solid surface article, said method including the steps of:
   providing a mold having a mold cavity defined therein, said mold cavity corresponding to said article;
   providing a curable coating composition comprising:
      at least 25% by weight of a liquid, thermosetting resin,
      25–40% by weight of a polymerizable, vinyl material,
      0.1–10% by weight of an air release agent,
      0.1–10% by weight of a wetting agent,
      a thixotropic agent present in an amount sufficient to provide said composition with a thixotropic index of at least 4.5, and
   10–40% by volume of a solid, particulate material having a particle size of up to 0.1 inch; and
   coating said composition onto at least a portion of the mold cavity.

2. The method of claim 1, including the further steps of: at least partially curing said composition in said mold cavity, and then disposing a curable body of backer material upon said at least partially cured composition.

3. The method of claim 1, wherein said thermosetting resin comprises a neopentylglycol isophthalate resin.

4. The method of claim 1, wherein said composition further includes a silane coupling agent therein.

5. The method of claim 1, wherein said composition further includes a mineral filler in said thermosetting resin, said mineral filler having a particle size smaller than the particle size of said particulate material.

6. The method of claim 5, wherein said mineral filler comprises alumina trihydrate.

7. The method of claim 1, wherein said composition further includes an ultraviolet stabilizer therein.

8. The method of claim 1, wherein said thixotropic agent is present in an amount sufficient to provide said composition with a thixotropic index of at least 5.

9. The method of claim 1, wherein said particulate material is negatively buoyant in said composition.

10. The method of claim 1, wherein the step of coating said composition to said mold cavity comprises applying said composition in a thickness in the range of 30–40 mils.

11. The method of claim 1, wherein the step of coating said composition to said mold cavity comprises spraying said composition into said mold cavity.

12. The method of claim 1, wherein said particulate material comprises polybutyl terephthalate.

13. The method of claim 1, wherein said particulate material has a size in the range of 0.004 to 0.040 inch.

14. The method of claim 13, wherein the average size of said particulate material is approximately 0.020 inch.

15. The method of claim 1, wherein at least a portion of said particulate material is transparent.

* * * * *